United States Patent Office 2,922,663
Patented Jan. 26, 1960

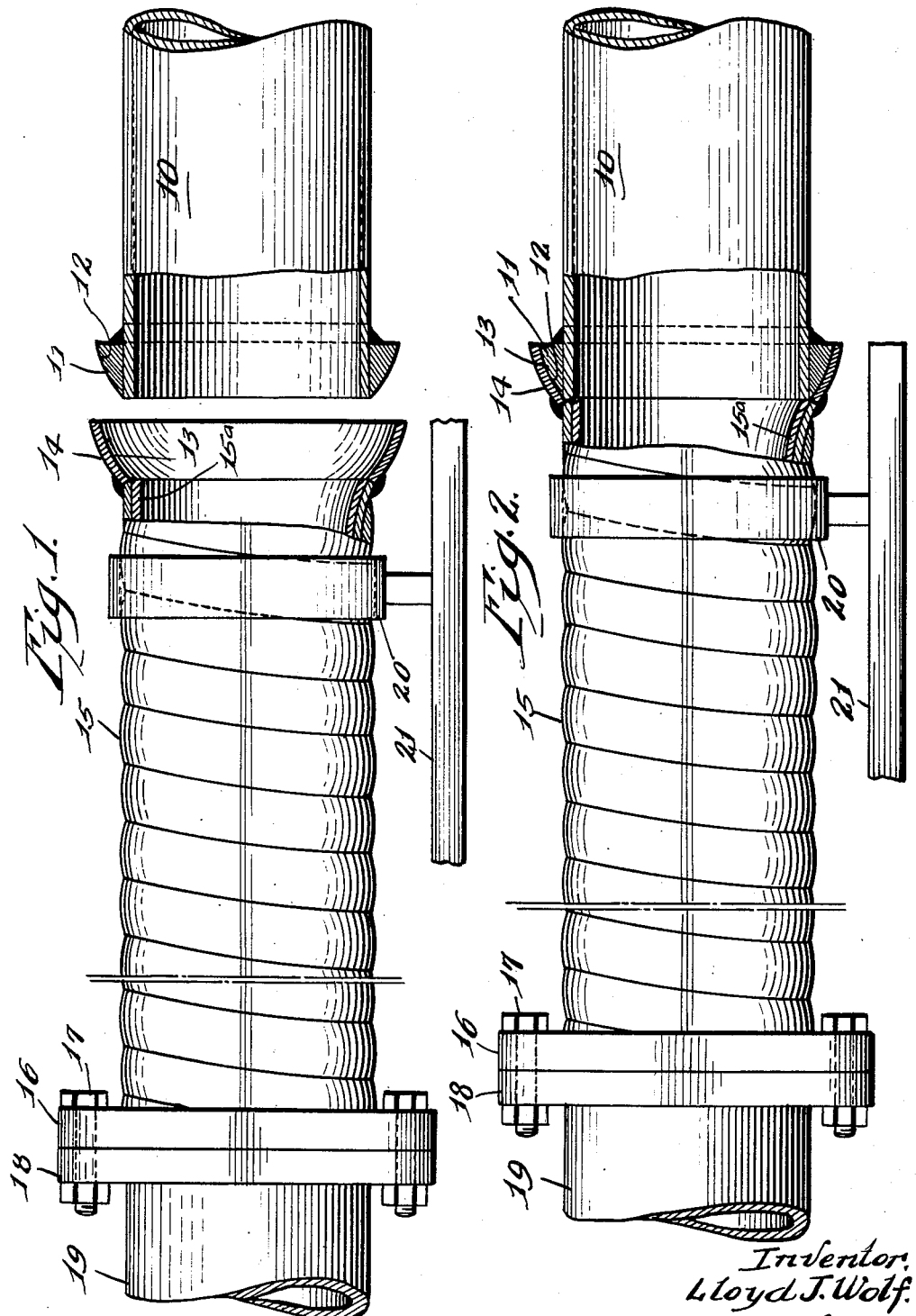

2,922,663

EXHAUST PIPE COUPLING WHOSE SEAL IS EFFECTED BY THE LINEAR EXTENSION OF THE MEMBERS DUE TO HEAT

Lloyd J. Wolf, Irving, Tex.

Application June 22, 1956, Serial No. 593,154

1 Claim. (Cl. 285—9)

My invention relates to an exhaust pipe structure for use with internal combustion engines.

According to current practice, the components of an exhaust pipe system require either the affixation of flanges to the adjacent ends of a pair of pipe sections and bolts to clamp the flanges together, or tapered flanges which are drawn against upsets on the pipe to effect a sealed joint. Either of these arrangements are comparatively expensive and are further objectionable when used with engines that are mounted in vehicle chassis in such a manner that, after breaking the exhaust connections, they may be rolled along the vehicle side frames to a position more convenient for repair, or for lifting bodily from the chassis. With the present type of exhaust pipe connection, this requires the removal of the flange clamping bolts and their replacement when the engine is restored to operating position. In many instances, access to the bolts is difficult because of restrictions imposed by the vehicle body.

It is therefore one object of the invention to provide an exhaust pipe structure which eliminates the usual flanges and the clamping bolts therefor and secures a leak tight connection between adjacent sections of the pipe by a linear extension of one of the sections established by the hot gases passing therethrough.

A further object is the provision of a structure as above in which the adjoining pipe or tube sections are devoid of any mechanical connection therebetween so that when used with a roll-out engine, for example, it is merely necessary to move the engine to separate the exhaust pipe sections.

A further object is the inclusion in an arrangement of the character above of a length of metallic, flexible tubing composed of overlapping convolutions which constitutes one of the pipe sections and whose linear extension when heated sets up the seal with the adjacent pipe section, the contact between the tubing and pipe being such that some misalignment thereof may be present without affecting the integrity of the seal.

These and further objects of the invention will be set forth in the following specification, reference being had to the accompanying drawing, and the novel means by which the objects are effectuated will be definitely pointed out in the claim.

In the drawing:

Fig. 1 is an elevation of the structure, partly in section, showing the sealing parts separated, such as would occur when the engine is being removed from or restored to position.

Fig. 2 is a view similar to Fig. 1, but with the components in sealing position.

Referring to Fig. 1, the numeral 10 designates, by way of example, a pipe constituting the discharge terminal of the exhaust manifold of an internal combustion engine and welded in encircling relation to its delivery end is a ring 11 having a convex, peripheral surface 12. This surface is intended to mate with and have leak tight, seating relation to an annular, concave surface 13 provided internally of a ring 14 that is welded to one end of a metallic, flexible tubing 15 which is composed in the characteristic and well known manner of overlapping convolutions of strip material, usually steel, and may be lined with a heat resistant material 15ª such as asbestos. The opposite end of the tubing 15 may carry a flange 16 for clamped connection by means of bolts 17 to a companion flange 18 secured to a pipe 19 which may lead to a muffler (not shown).

Referring to Fig. 2 which shows the pipe 10 moved to secure contact of the surfaces 12 and 13, as by shifting the engine to its normal operating position in the chassis. With all parts cold, the contact of the surfaces 12 and 13 is merely in the nature of a touch fit, but when the engine is started, the pipe 10 and tubing 15 have their temperatures raised rapidly by the exhaust gas flowing therethrough and each expands in length. This linear extension is substantially greater in the tubing 15 by reason of its metallic wrapped construction so that the surfaces 12 and 13 engage with a leak tight fit and remain so while the hot gas flows through the pipe 10 and tubing 15. It has been ascertained that, if the tubing is about one foot in length and has a diameter commonly used for truck engine exhaust pipes, its linear extension when heated will be sufficient to tightly seal a cold gap of about one-sixteenth of an inch between the surfaces 12 and 13. The concavo-convex relation of the surfaces 13 and 12, respectively, is that of a ball and socket joint and hence misalignment of the pipe 10 and tubing 15 within reasonable limits does not disturb the leak tight fit of the surfaces.

To insure that the ring 14 will always be maintained in a position for coaction with the ring 11, notwithstanding many removals and restorals of the engine, a guide ring 20 loosely encircles the tubing 15 and is suitably supported on a convenient part 21 of the chassis.

I claim:

An exhaust pipe structure for handling hot fluids comprising a pair of metallic tubular members whose adjacent ends are generally opposed in coaxial relation, the members being held against axial movement when in fluid conducting positions, one member being composed of a spirally wound strip having overlapping convolutions and whose linear extension due to heat is greater than that of the other member, means for guidably supporting said one member, and rings carried by the opposed ends of the members, respectively, and shaped for sealing contact with each other, the seal being solely effected by the linear extension of the members due to heat when the rings are in contact and the members including the rings being free of mechanical connection with each other axially of the structure whereby the members may be relatively freely moved to separate and contact the rings.

References Cited in the file of this patent

UNITED STATES PATENTS

| | | |
|---|---|---|
| 381,670 | Botsford | Apr. 24, 1888 |
| 700,378 | Schmidt | May 20, 1902 |
| 848,169 | Hawley | Mar. 26, 1907 |
| 1,487,517 | Krause | Mar. 8, 1924 |
| 1,780,693 | Yazel | Nov. 4, 1930 |
| 2,035,212 | Alborn | Mar. 24, 1936 |
| 2,242,604 | Wells | May 20, 1941 |
| 2,502,753 | Rohr | Apr. 4, 1950 |
| 2,613,754 | Van Doorne | Oct. 14, 1952 |
| 2,673,100 | Shumaker | Mar. 23, 1954 |